US012702995B2

(12) United States Patent
Granjon

(10) Patent No.: US 12,702,995 B2
(45) Date of Patent: Aug. 11, 2026

(54) METHOD AND DEVICE FOR ANALYZING A DEVICE FOR SPRAYING A PHARMACEUTICAL FLUID PRODUCT

(71) Applicant: APTAR FRANCE SAS, Le Neubourg (FR)

(72) Inventor: Guillaume Granjon, La Vacherie (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 18/725,487

(22) PCT Filed: Dec. 20, 2022

(86) PCT No.: PCT/FR2022/052429
§ 371 (c)(1),
(2) Date: Jun. 28, 2024

(87) PCT Pub. No.: WO2023/126596
PCT Pub. Date: Jul. 6, 2023

(65) Prior Publication Data

US 2025/0099998 A1 Mar. 27, 2025

(30) Foreign Application Priority Data

Dec. 30, 2021 (FR) ...................................... 2114687

(51) Int. Cl.
*B05B 12/08* (2006.01)

(52) U.S. Cl.
CPC .................................. *B05B 12/082* (2013.01)

(58) Field of Classification Search
CPC ..... B05B 12/082; A61M 11/00; A61M 15/00; A61M 2209/02

(Continued)

(56) References Cited

U.S. PATENT DOCUMENTS 5,047,612 A * 9/1991 Savkar ..................... H05H 1/42 219/76.16
2002/0048770 A1* 4/2002 Morozov ................ B05B 5/002 435/6.12

(Continued)

FOREIGN PATENT DOCUMENTS

EP 3 047 912 A1 7/2016
JP 54-127347 A 10/1979
JP 05-99802 A 4/1993

OTHER PUBLICATIONS

International Preliminary Report on Patentability dated Jun. 20, 2024 with a Translation of the Written Opinion of the International Searching Authority in Application No. PCT/FR2022/052429.

(Continued)

*Primary Examiner* — Marrit Eyassu
(74) *Attorney, Agent, or Firm* — Sughrue Mion, PLLC

(57) ABSTRACT

A method for analysing a device for spraying a pharmaceutical fluid product, including providing a spray head for a device for spraying a pharmaceutical fluid product, the spray head having a spray orifice; providing a receiving surface having discrete contact zones separated by voids, the contact zones electrically conductive; passing a flow of ionised gas through the spray orifice, the flow of ionised gas being charged with electrons; sending the flow of ionised gas onto the receiving surface; visualising the impact zone for the flow of ionised gas on the receiving surface, and analysing the visualisation of the impact zone in order to determine whether the impact zone complies with predetermined specifications.

7 Claims, 1 Drawing Sheet

Figure 1:
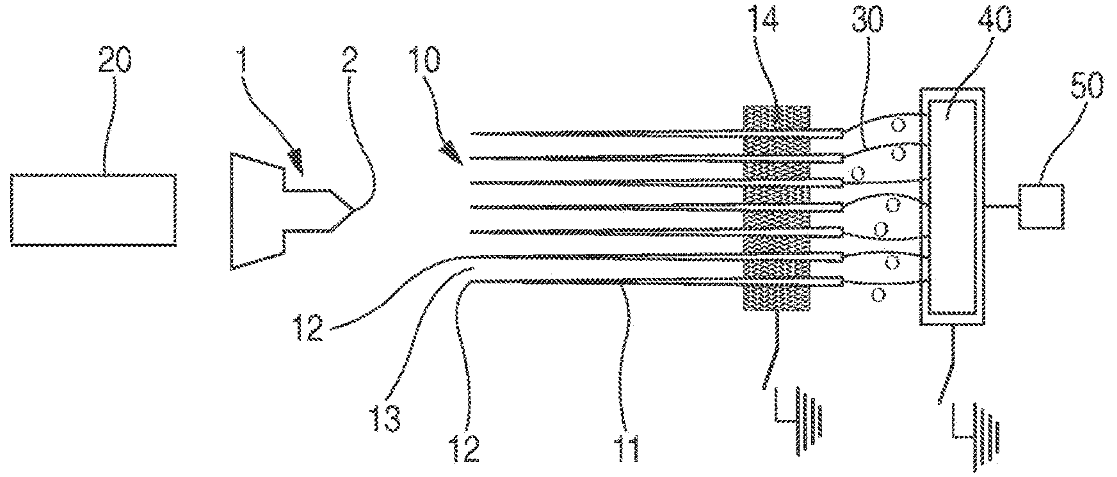

(58) Field of Classification Search
USPC .......................................................... 73/861
See application file for complete search history.

(56) References Cited

U.S. PATENT DOCUMENTS

| | | | | |
|---|---|---|---|---|
| 2014/0033979 | A1* | 2/2014 | Marriott | G05B 23/0229 118/713 |
| 2016/0216108 | A1* | 7/2016 | Bettinelli | B05B 12/004 |
| 2019/0198307 | A1* | 6/2019 | Jones | H01J 49/165 |
| 2019/0376106 | A1* | 12/2019 | Boisvilliers | G01M 99/008 |

OTHER PUBLICATIONS

International Search Report for PCT/FR2022/052429 dated Apr. 5, 2023 (PCT/ISA/210).

* cited by examiner

METHOD AND DEVICE FOR ANALYZING A DEVICE FOR SPRAYING A PHARMACEUTICAL FLUID PRODUCT

CROSS REFERENCE TO RELATED APPLICATIONS

This application is a National Stage of International Application No. PCT/FR2022/052429 filed Dec. 20, 2022, claiming priority based on French Patent Application No. 2114687 filed Dec. 30, 2021.

The present invention relates to a device and to a method for analysing a spray generated by a device for spraying a pharmaceutical fluid.

Spray devices for spraying pharmaceutical fluid are well known. They generally comprise a spray head provided with a spray orifice, assembled on a reservoir containing the fluid product to be distributed. Particularly in nasal spray applications, the therapeutic effectiveness of the sprayed fluid product may depend on the properties of the spray generated while the device is being actuated. At the end of the assembly line, i.e. once the spray device has been assembled and just prior to being sent to the pharmaceutical fluid manufacturer for assembly there onto a corresponding reservoir, it is known for a certain number of samples of assembled devices to be laboratory tested in order to check whether the properties of the spray correspond to predefined production specifications.

A disadvantage with that system is that it pertains to assembled devices, and thus destroys those devices which, after having been tested, can no longer be delivered to the customer.

Furthermore, the system requires human verification of the tested devices, and is thus not suitable for being completely automated.

To overcome this disadvantage, the document WO 2018/130791 proposes visualization of a flow of hot or cold compressed air sent through a spray head by strioscopy. That method makes it possible to evaluate the angle of the spray, but not its geometry, nor its symmetry. This also has the disadvantage of having to provide a strioscopic bench, which is relatively complex and expensive, and which is difficult to adapt to an assembly line for a fluid spray device, and therefore involves either random tests carried out on only a portion of the manufactured devices, or slowing down the assembly line, which is generally undesirable.

Documents EP 3 047 912, JPH 0599802 and JPS 5412 7347 describe other prior art devices.

An object of the present invention is to overcome the above-mentioned drawbacks.

In particular, the aim of the present invention is to provide a device and a method for analysing a device for spraying a pharmaceutical fluid product that do not involve the destruction of the tested devices.

The present invention also aims to provide a device and a method for analysis which is substantially automated.

The present invention also aims to provide a device and method for analysis which makes it possible to test 100% of the spraying devices, without slowing down the assembly line to a substantial extent.

Another aim of the present invention is to provide a device and method for analysis which is simple and/or inexpensive to manufacture, assemble and use.

What is therefore presented is a method for analysing a device for spraying a pharmaceutical fluid product, comprising the following steps:

- providing a spray head for a device for spraying a pharmaceutical fluid product, said spray head comprising a spray orifice;
- providing a receiving surface comprising a plurality of discrete contact zones separated by voids, said contact zones being electrically conductive,
- passing a flow of ionised gas through said spray orifice of said spray head, said flow of ionised gas being charged with electrons,
- sending said flow of ionised gas onto said receiving surface,
- visualising the impact zone for said flow of ionised gas on said receiving surface, and
- analysing said visualisation of said impact zone in order to determine whether or not said impact zone complies with predetermined specifications.

Advantageously, said flow of ionised gas is a flow of compressed air.

Advantageously, said flow of ionised gas is a flow of ionised pulsed air.

Advantageously, said step for analysis comprises determining the geometry, in particular the symmetry, of the impact zone for said flow of compressed gas on said receiving surface.

Advantageously, said predetermined specifications comprise a predetermined planar extent of the impact zone for said flow of ionised gas on said receiving surface, in a manner such that the spray heads for which said planar extent is similar to said predetermined planar extent are classified as compliant, and the spray heads for which said planar extent is different from said predetermined planar extent are classified as non-compliant.

Advantageously, the operating cycle comprises the following steps:

- connecting surface to ground in order to eliminate any electrical charges,
- generating said flow of ionised gas and sending it through said spray head onto said receiving surface,
- detecting each contact zone which becomes charged with negative ions in contact with said flow of ionised gas, and
- visualising said impact zone by means of a man-machine interface.

The present invention also concerns a device for analysing a device for spraying a pharmaceutical fluid product, comprising:

- a spray head for a device for spraying a pharmaceutical fluid product, said spray head comprising a spray orifice;
- a receiving surface comprising a plurality of discrete contact zones separated by voids, said contact zones being electrically conductive,
- grounding means for eliminating any electrical charges from said receiving surface before each analysis,
- means for generating a flow of ionised gas in order to pass a flow of ionised gas through said spray orifice of said spray head and sending it onto said receiving surface, said flow of ionised ionised being charged with electrons,
- processing means for visualising the impact zone for said flow of ionised gas on said receiving surface, and
- means for analysis for the analysis of said visualisation of said impact zone in order to determine whether or not said impact zone complies with predetermined specifications.

Advantageously, said flow of ionised gas is a flow of ionised pulsed air.

Advantageously, said processing means comprise an amplifier and means for measuring the potential difference for each contact zone.

Advantageously, each contact zone of said receiving surface is connected to said processing means by a respective low impedance cable.

Advantageously, said receiving surface is formed by the ends of a plurality of points disposed in an array, said ends forming said contact zones.

Advantageously, said points are secured to a base connected to the ground.

Advantageously, said points are equidistant from and close to one another, thus forming a regular and dense array of contact zones on said receiving surface.

Advantageously, said means for generating a flow of ionised gas are adapted to generate pulses of adjustable duration, in particular from 50 to 300 ms.

Figure 2:
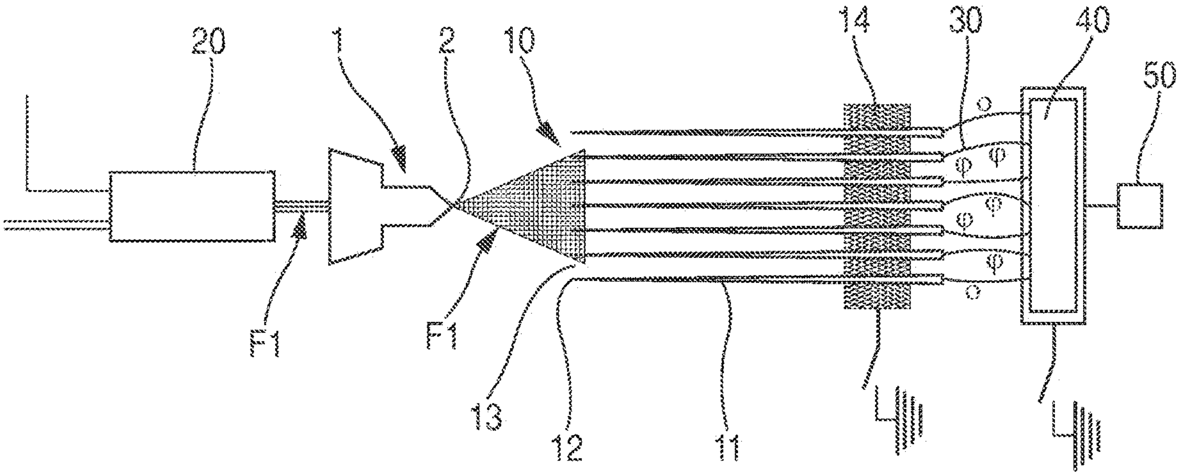
Figure 3:
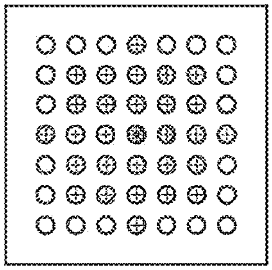
Figure 4:
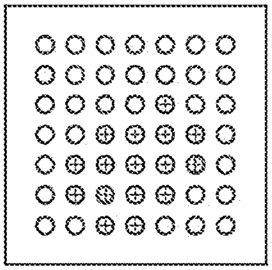

These features and advantages and others will appear more clearly during the detailed description below, made in reference to the accompanying drawings, given as non-limiting examples, and wherein:

FIG. 1 is a diagrammatic view of a device for analysing a spray device in accordance with an advantageous embodiment, before actuation, FIG. 2 is a view similar to the view in FIG. 1, during actuation, FIG. 3 shows a visualisation of a compliant impact zone, and FIG. 4 shows a visualisation of a non-compliant impact zone.

One aim of the invention is to improve the quality of spray device inspection. To this end, the invention envisages the analysis of 100% of the devices, without substantially slowing down the assembly line.

In conventional manner, each spraying device comprises a spraying head 1 provided with a spraying orifice 2. In general, a spray profile (not shown) is provided upstream of said spray orifice 2 in order to generate a conical spray shape at the outlet from the orifice.

The present invention envisages passing a flow of ionised gas F1, preferably compressed, through each spray head 1, and directing this flow F1 leaving the spray orifice 2 in the form of a conical spray towards a receiving surface 10. Advantageously, the flow of ionised gas F1 is a flow of ionised air, but it should be understood that, in accordance with the invention, any suitable gas other than air could be used.

The flow of ionised gas F1 is charged with electrons, and at the moment when this flow F1 is expelled through the spray orifice 2, the receiving surface 10 is without any electrical charges.

FIGS. 1 and 2 shows a test device according to an advantageous embodiment.

In this example, a spray head 1 is disposed opposite a receiving surface 10. Means 20 for generating a flow of ionised gas F1 are provided in order to cause a flow of ionised gas F1 charged with electrons to pass through the spray head 1.

The receiving surface 10 forms a plane comprising a plurality of contact zones 12 separated from one another by a plurality of voids 13. Each contact zone 12 is electrically conductive.

In the example shown, the receiving surface 10 is formed by the ends of a plurality of points 11 disposed in an array. These ends then form the contact zones 12. Each point 11 thus forms an anode operating like a lightning rod. These points 11 may be secured to a base 14, preferably insulating, and which may, before each analysis, be connected to the ground in order to eliminate any electrical charges from the receiving surface 10.

Advantageously, the points 11 are equidistant from and close to one another, thereby forming a regular and dense array of contact zones 12 on the receiving surface 10. The more points 11 there are and the smaller the contact zones 12, the more accurate will be the definition of the impact zone for the flow of compressed gas F1 on the reception surface 10 and the better will be the rendering of the shape of this impact zone.

The particular shape of the receiving surface 10, with a plurality of discrete contact zones 12 separated by voids 13, means that a local contact can be made by the flow of compressed gas F1 on the contact zones 12, without dispersions and without perturbations to the flow, which makes the impact zone visible with great reliability.

In order to carry out the compliance evaluations, processing means 40 are provided to visualize the impact zone and analysis means 50 are provided to analyse the visualizations generated by the processing means 40 and thus determine whether the impact zone of the flow of ionized gas F1 coming from said spray head 1 onto the receiving surface 10 is compliant or not with predetermined specifications.

The processing means 40 may comprise an amplifier for amplifying the electrical signals received from the receiving surface 10. Advantageously, each electrically conductive contact zone 12 is connected to said processing means 40 by a respective low impedance cable 30. The processing means 40 can thus calculate potential differences for each contact zone 12 which has been charged with negative ions in contact with the flow of ionised gas F1 and thus create a matrix forming a visualisation of the impact zone.

The duration of the ionised gas pulse F1 is advantageously adjustable, in particular from 50 to 300 ms.

Advantageously, a plurality of successive cycles are carried out on the same spray head, for example five cycles. The consistency or repeatability of the results also makes it possible to evaluate the compliance of said spray head.

The predetermined specifications may comprise a predetermined planar extent of said impact zone on said receiving surface 10, in a manner such that the spray heads 1 for which said planar extent is similar to said predetermined planar extent are classified as compliant, and the spray heads 1 for which said planar extent is different from said predetermined planar extent are classified as non-compliant. The geometry, and in particular the symmetry, of the impact zone may also be used in the compliance evaluation. Other parameters may also be envisaged.

The analysis means 50 may comprise means for measuring the geometry of the impact zone of the flow of ionised gas F1 on the reception zone 10. As an example, the centre of mass of the impact zone is determined, and the maximum and minimum distances of this centre of mass from the edge of the impact zone are measured. Comparing these distances with predetermined values then makes it possible to evaluate the compliance of the tested device. Thus, the compliance evaluation takes not only the surface of the impact zone into account, but also its geometry, in particular its symmetry. This makes it possible to establish that a spray leaving a compliant spray head will have an acceptable conical shape, both from the point of view of the angle of the spray and as regards its symmetry.

Optionally, image processing means may be used to carry out this type of analysis.

FIGS. 3 and 4 each illustrate a diagrammatic representation obtained with the method and the device of the invention, in which it is possible to evaluate the planar extent and the geometry, in particular the symmetry, of the impact zone. FIG. 3 shows a visualisation of the impact zone for a compliant device and FIG. 4 shows such a visualisation for a non-compliant device.

The present invention presents numerous advantages, and in particular:

- it enables various types of spray device to be inspected in an automated manner;
- it enables said spray devices to be analysed non-destructively;
- it makes it possible to analyse 100% of the spray devices assembled on an assembly line, without slowing down the assembly line substantially;
- it makes it possible to carry out several successive tests on the same device in order to evaluate the repeatability of the results;
- it uses a setup that is compact and that can easily be adapted;
- it uses components which are simple and standard, and thus generally inexpensive;
- it enables image processing to be robust, and it can be carried out in real time;
- it guarantees good repeatability and good discrimination between compliant and non-compliant devices.

The present invention has been described with reference to an advantageous embodiment, but naturally any modification could be applied thereto by the person skilled in the art, without going beyond the scope of the present invention, as defined by the accompanying claims.

The invention claimed is:

1. A method for analysing a device for spraying a pharmaceutical fluid product, characterized in that it comprises the following steps:

- providing a spray head for a device for spraying a pharmaceutical fluid product, said spray head comprising a spray orifice,
- providing a receiving surface comprising a plurality of discrete contact zones separated by voids, said contact zones being electrically conductive,
- passing a flow of ionised gas through said spray orifice of said spray head, said flow of ionised gas being charged with electrons,
- sending said flow of ionised gas onto said receiving surface,
- visualising an impact zone for said flow of ionised gas on said receiving surface, and
- determining from said visualizing of said impact zone whether or not said impact zone complies with predetermined specifications; and
- wherein an operating cycle comprises the following steps:
- connecting said receiving surface to ground in order to eliminate any electrical charges,
- generating said flow of ionised gas and sending it through said spray head onto said receiving surface,
- detecting each contact zone which becomes charged with negative ions in contact with said flow of ionised gas, and
- visualising said impact zone with processing means.

2. The method as claimed in claim 1, in which said flow of ionised gas is a flow of compressed air.

3. The method as claimed in claim 1, in which said flow of ionised gas is a flow of ionised pulsed air.

4. The method as claimed in claim 1, in which said determining comprises determining a geometry, in particular a symmetry, of the impact zone for said flow of ionized gas on said receiving surface.

5. The method as claimed in claim 1, in which said predetermined specifications comprise a predetermined planar extent of the impact zone for said flow of ionized gas on said receiving surface, in a manner such that the spray head for which a planar extent is similar to said predetermined planar extent are classified as compliant, and the spray head for which a planar extent is different from said predetermined planar extent are classified as non-compliant.

6. The method as claimed in claim 1, wherein said processing means creates a matrix of the impact zone for visualization.

7. The method as claimed in claim 1, wherein said flow of ionised gas is a flow of compressed air.

* * * * *